United States Patent
Yang et al.

(10) Patent No.: US 10,540,610 B1
(45) Date of Patent: Jan. 21, 2020

(54) GENERATING AND APPLYING A TRAINED STRUCTURED MACHINE LEARNING MODEL FOR DETERMINING A SEMANTIC LABEL FOR CONTENT OF A TRANSIENT SEGMENT OF A COMMUNICATION

(71) Applicant: Google Inc., Mountain View, CA (US)

(72) Inventors: Jie Yang, Sunnyvale, CA (US); Amr Ahmed, Mountain View, CA (US); Luis Garcia Pueyo, San Jose, CA (US); Mike Bendersky, Sunnyvale, CA (US); Amitabh Saikia, Mountain View, CA (US); Marc-Allen Cartright, Stanford, CA (US); Marc Alexander Najork, Palo Alto, CA (US); MyLinh Yang, Saratoga, CA (US); Hui Tan, Palo Alto, CA (US); Weinan Zhang, London (GB); Vanja Josifovski, Los Gatos, CA (US); Alexander J. Smola, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 923 days.

(21) Appl. No.: 15/139,807

(22) Filed: Apr. 27, 2016

Related U.S. Application Data

(60) Provisional application No. 62/202,832, filed on Aug. 8, 2015.

(51) Int. Cl.
G06N 7/00 (2006.01)
G06N 20/00 (2019.01)
H04L 12/58 (2006.01)

(52) U.S. Cl.
CPC ............. *G06N 20/00* (2019.01); *G06N 7/005* (2013.01); *H04L 51/22* (2013.01)

(58) Field of Classification Search
CPC ....................................................... G06N 7/005
USPC ............................................................ 706/46
See application file for complete search history.

(56) References Cited

U.S. PATENT DOCUMENTS

2013/0159277 A1* 6/2013 Liu ........................ G06F 17/271
707/709

OTHER PUBLICATIONS

Dong et al (Personal Information Extraction of the Teaching Staff Based on CRFs) (Year: 2015).*
Ailon et al.; Threading Machine Generated Email; WSDM 2013; 10 pages; ASM; US. Jan. 1, 2013.
Aji, S. M. and McEliece, R. J.; The Generalized Distributive Law; IEEE Transactions on Information Theory; 44 pages; vol. 46 (2), 2000; US. Mar. 2, 2000.

(Continued)

Primary Examiner — Lut Wong
(74) Attorney, Agent, or Firm — Middleton Reutlinger

(57) ABSTRACT

Methods, apparatus, and computer-readable media are provided for analyzing a cluster of communications, such as B2C emails, to generate a template for the cluster that defines transient segments and fixed segments of the cluster of communications. More particularly, methods, apparatus, and computer-readable media are provided for generating and/or applying a trained structured machine learning model for a generated template that can be used to determine, for one or more transient segments of subsequent communications, a corresponding probability that a given semantic label is the correct semantic label for extracted content of the transient segment(s).

16 Claims, 9 Drawing Sheets

(56) References Cited

OTHER PUBLICATIONS

Bird C., et al.; Mining Email Social Networks; Workshop on Mining Software Repositories; 7 pages; ACM, 2006; China Jan. 1, 2006.
Blanzieri, E. and Bryl, A. A Survey of Learning-based Techniques of Email Spam Filtering; Artificial Intelligence Review; 30 pages; vol. 29(1), Jan. 2008, Italy Jan. 1, 2008.
Breiman, L.; Random Forests; Machine learning, 32 pages; vol. 45(1), Jan. 2001; US Jan. 1, 2001.
Brutlag, J. D. and Meek, C.; Challenges of the Email Domain for Text Classification; International Conference of Machine Learning, 8 pages; 2000; US Jan. 1, 2000.
Buttler, D. et al.; A Fully Automated Object Extraction System for the World Wide Web. In ICDCS, 30 pages; May 2001; US May 1, 2001.
Chang, C.-H. and Lui , S.-C.; Iepad: Information Extraction Based on Pattern Discovery. In WWW; pp. 681-688. ACM, May 2001; Hong Kong May 1, 2001.
Cormack, G.; V. Email Spam Filtering: A Systematic Review. Foundations and Trends in Information Retrieval; 42 pages; vol. 1(4), Apr. 2007; US Apr. 1, 2007.
Cortes, C. and Vapnik,V.; Support-vector Networks. Machine Learning; vol. 20; pp. 273-297, 1995; US Jan. 1, 1995.
Craven, M. and Kumlien, J.; Constructing Biological Knowledge Bases by Extracting Information from Text Sources. In ISMB; 10 pages; 1999; US Jan. 1, 1999.
Crescenzi, V., et al. Roadrunner: Towards Automatic Data Extraction from Large Web Sites; In VLDB, vol. 1, 10 pages; 2001; USA Jan. 1, 2001.
Dalvi, N., et al.; Automatic Wrappers for Large Scale Web Extraction; Proceedings of the VLDB Endowment; vol. 4(4); pp. 219-230, Jan. 2011; USA Jan. 1, 2011.
Diesner, J., et al.; Communication Networks from the Enron Email Corpus "It's Always about the People. Enron Is No Different". Computational & Mathematical Organization Theory, vol. 11(3); pp. 201-228, Oct. 2005; Netherlands. Oct. 1, 2005.
Embley D. W., et al.; Record-Boundary Discovery in Web Documents; ACM SIGMOD Record; vol. 28(2); pp. 1-24, Sep. 16, 1999; Taiwan Sep. 16, 1999.
Friedman, J. H.; Multivariate Adaptive Regression Splines; The Annals of Statistics; IMS; vol. 19(1); pp. 1-67, Mar. 1991; US Mar. 1, 1991.
Ganchev, K. et al.; Posterior Regularization for Structured Latent Variable Models; JMLR, vol. 11; pp. 2001-2049, Mar. 1, 2010; US Mar. 1, 2010.
Gupta, S., et al.; Dom-Based Content Extraction of Html Documents; In WWW, 10 Pages; 2003; US Jan. 1, 2003.
Hall, K., et al.; Training Dependency Parsers by Jointly Optimizing Multiple Objectives. In Empirical Methods in Natural Language Processing; 11 Pages; 2011; US Jan. 1, 2011.
Hastie, T., et al.; The Elements of Statistical Learning; vol. 1; Springer; 2001; US Jan. 1, 2001.
Hoffmann, R., et al.; Knowledge-Based Weak Supervision for Information Extraction of Overlapping Relations; Association for Computational Linguistics; vol. 1; 2011; US Jan. 1, 2011.
Horst, R. and Thoai, N. V.; Dc Programming: Overview; Journal of Optimization Theory and Applications, vol. 103(1) pp. 1-43; Oct. 1999; US Oct. 1, 1999.
Jin, R. and Ghahramani, Z.; Learning with Multiple Labels; NIPS; 8 Pages; 2002; US Jan. 1, 2002.
Kiritchenko, S. and, Matwin, S.; Email Classification with Co-Training; In CASCON; IBM Corp.; 10 pages ; 2011; US Jan. 1, 2011.
Klementiev, A. and, Roth, D.; Weakly Supervised Named Entity Transliteration and Discovery from Multilingual Comparable Corpora; In ACL; pp. 817-824; 2006; US Jan. 1, 2006.

Klimt, B. and, Yang, Y.; The Enron Corpus: A New Dataset for Email Classification Research; vol. 3201; 11 Pages; Sep. 2004; Italy Sep. 1, 2004.
Kulkarni, A. and, Pedersen, T.; Name Discrimination and Email Clustering Using Unsupervised Clustering and Labeling of Similar Contexts; In IICAI; pp. 703-722; 2005; India Jan. 1, 2005.
Lafferty, J., et al.; Conditional Random Fields: Probabilistic Models for Segmenting and Labeling Sequence Data; In ICML; 10 Pages; 2001; US Jan. 1, 2001.
Li, H., et al.; Adding Semantics to Email Clustering; ICDM; 5 Pages; 2006 Jan. 1, 2006.
Liu, B., et al.; Mining Data Records in Web Pages; KDD; ACM; 6 Pages; 2003; US Jan. 1, 2003.
Mann, G. S. and, McCallum, A.; Generalized Expectation Criteria for Semi-Supervised Learning with Weakly Labeled Data; JMLR, vol. 11; 955-984, Mar. 1, 2010; US Mar. 1, 2010.
Mintz, M., et al.; Distant Supervision for Relation Extraction without Labeled Data; ACL; vol. 2; 9 Pages; 2009; US Jan. 1, 2009.
Breiman, L., et al.; Classification and Regression Trees; Wadsworth International Group; 1984; US Jan. 1, 1984.
Pasca, M.; Weakly-Supervised Discovery of Named Entities Using Web Search Queries; CIKM; ACM; pp. 683-690; Jan. 2007; Portugal Jan. 1, 2007.
Ravikumar, P., et al.; High-Dimensional Ising Model Selection Using L1-Regularized Logistic Regression; The Annals of Statistics, vol. 38(3); pp. 1-34; 2010 Jan. 1, 2010.
Ridgeway, G.; Generalized Boosted Regression Models; Documentation on the R Package 'gbm', version; vol. 1(5-7); 22 pages; Apr. 15, 2006 Apr. 15, 2006.
Riedel, S., et al.; Modeling Relations and Their Mentions without Labeled Text; ECML; pp. 148-163; 2010; US Jan. 1, 2010.
Rowe, R, et al.; Automated Social Hierarchy Detection through Email Network Analysis; WEBKDD and SNA-KDD; ACM; 9 pages; 2007; US Jan. 1, 2007.
Rush, A. and. Collins, M.; A Tutorial on Dual Decomposition and Lagrangian Relaxation for Inference in Natural Language Processing; pp. 1-53; Sep. 2012; US Sep. 1, 2012.
Rush, A. M.., et al.; On Dual Decomposition and Linear Programming Relaxations for Natural Language Processing; EMNLP; 11 pages; 2010; US Jan. 1, 2010.
Tseng, C.Y., et al.; Promail: Using Progressive Email Social Network for Spam Detection; Advances in Knowledge Discovery and Data Mining; 8 pages; 2007; Taiwan Jan. 1, 2007.
Yoo, S., et al.; Mining Social Networks for Personalized Email Prioritization; KDD; 9 pages; Jun. 2009; France Jun. 28, 2009.
Youn, S. and, McLeod, D.; A Comparative Study for Email Classification; Advances and Innovations in Systems; 5 pages; 2007; US Jan. 1, 2007.
Zhai, Y. and, Liu, B.; Web Data Extraction Based on Partial Tree Alignment; WWW; ACM; 10 pages; May 2005; US May 1, 2005.
Zhu, J., et al.; 2d Conditional Random Fields for Web Information Extraction; ICML; ACM; 8 pages; 2005; US Jan. 1, 2005.
Zhu, J., et al.; Simultaneous Record Detection and Attribute Labeling; In Web Data Extraction; KDD; ACM; 10 pages; Aug. 2006; China Aug. 1, 2006.
Zhu, J., et al.; Dynamic Hierarchical Markov Random Fields for Integrated Web Data Extraction; JMLR; vol. 9; pp. 1583-1614; Jun. 2008; US Jun. 1, 2008.
Zhu, X.; Semi-supervised Learning Literature Survey; Computer Science; University of Wisconsin-Madison; pp. 1-52; Dec. 2006; US Dec. 1, 2006.
Zhu, X and, Goldberg, A. B.; Introduction to Semi-supervised Learning; Morgan & Claypool Publishers; No. 6; 2009; US Jan. 1, 2009.
Zhang, W., et al.; Annotating Needles in the Haystack without Looking: Product Information Extraction from Emails; KDD; ACM; pp. 2257-2266; Aug. 2015; Australia Aug. 11, 2015.

\* cited by examiner

GENERATING AND APPLYING A TRAINED STRUCTURED MACHINE LEARNING MODEL FOR DETERMINING A SEMANTIC LABEL FOR CONTENT OF A TRANSIENT SEGMENT OF A COMMUNICATION

BACKGROUND

Business-to-consumer ("B2C") emails and similar communications may often follow more structured patterns than person-to-person emails, with many being created automatically using templates. However, these templates are not typically made available to entities interested in extracting data from these communications. Some B2C communications may be structured using markup languages such as the Hyper Text Markup Language ("HTML") or the Extensible Markup Language ("XML"). Other B2C communications may take the form of plain text.

SUMMARY

The present disclosure is generally directed to methods, apparatus, and computer-readable media (transitory and non-transitory) for analyzing a cluster of communications, such as B2C emails, to generate a template for the cluster that defines transient segments and fixed segments of the cluster of communications. More particularly, the present disclosure is directed to methods, apparatus, and computer-readable media for generating and/or applying a trained structured machine learning model for a generated template that can be used to determine, for one or more transient segments of subsequent communications, a corresponding probability that a given semantic label is the correct semantic label for extracted content of the transient segment(s).

The trained structured machine learning model for a template enables structured prediction of the given semantic label that may take into account context of subsequent communications that match the template (e.g., it may take into account the sequence of the given semantic label and "neighboring" semantic labels). In some implementations, a structured machine learning model may be trained for a template based only on training examples that are generated based on communications that have been determined to match that template. In some of those and/or other implementations, the training examples on which the structured machine learning model is trained may each include one or more features that are determined based on output from a classifier (i.e., a "weak learner") that has been trained to output probability of a given semantic label based on input properties. For example, a feature of a training example may be a weight for the training example that is based at least in part on a probability provided as output from the classifier based on properties of a communication provided as input to the classifier. The classifier may optionally be trained based at least in part on one or more communications that do not conform to the template. Techniques disclosed herein may be utilized to generate multiple templates and generate multiple trained structured machine learning models. Each of the structured machine learning models may be trained based on training examples that are specific to communications that conform to a corresponding template—and each of the models may be assigned to a corresponding template and utilized as the model for subsequent communications that conform to the template. Accordingly, each of a plurality of templates may have a corresponding assigned structured machine learning model that is specific to the template.

A generated template may be configured to enable extraction of content of one or more transient segments from subsequent communications, while optionally ignoring content of confidential transient segments and/or content of fixed segments that is shared among the structured communications of the cluster (e.g., boilerplate). For example, the template may be used to extract, from an email, content from transient segments, such as departure time, arrival time, arrival airport, product purchased, purchase price, shipping date, etc. Confidential information (e.g., information that could be used to identify someone) such as a recipient's name, address, credit card number, and so forth, as well as fixed boilerplate, may be ignored.

Moreover, semantic labels may be assigned to content extracted from transient segments based on various techniques described herein. For example, one or more semantic labels may be assigned to transient segments based on heuristics and/or regular expressions. For instance, a regular expression may be defined that assigns a "total price" label to a transient segment when content of that transient segment (currently extracted content or content from previous communications) includes "$", includes a numerical value (optionally with a "." that is followed by two numbers), and/or is preceded by a "fixed" segment that includes one or more terms (e.g., "total", "amount").

Also, for example, a trained structured machine learning model may be generated for a template of a cluster of communications that defines parameters for determining, for one or more transient segments of the template, a corresponding probability that a given semantic label is the correct semantic label for extracted content of the transient segment(s). The semantic label may be assigned to one or more of the transient segments when a determined corresponding probability satisfies a threshold. In some implementations, the trained structured machine learning model may be assigned to a template, selected for a subsequent communication that matches the template (e.g., conforms to a cluster of communications based on which the template was generated), and applied to the subsequent communication to determine whether the given semantic label is a correct label for content of one or more transient segments in the subsequent communication. For example, the trained structured machine learning model may be applied in view of features of the subsequent communication to determine the probability that the given semantic label is the correct label for a transient segment, and the given semantic label assigned to content of the given transient segment when the probability satisfies a threshold.

In some implementations, training examples are generated to train the structured machine learning model for a template. Each of the training examples defines a plurality of features, at least some of which are based on a communication that corresponds to the template (i.e., observed data). Various features may be utilized, such as annotated semantic labels for one or more transient segments, a "fixed" label for one or more fixed segments, one or more terms of fixed segments, one or more terms of transient segments, locations (i.e., the order) of transient and/or fixed segments, etc.

In some implementations, a semantic label for a transient segment of a communication that is utilized as a feature for a training example is a semantic label determined based on output from a classifier (i.e., a "weak learner") that generates a probability of the semantic label for the transient segment based on one or more properties related to the transient segment (e.g., content based properties, context based properties, search based properties, knowledge based properties). In some implementations, a probability of a semantic label being a correct label for one or more transient segments and/or a probability of the semantic label being an incorrect label for one or more of the transient segments may also be used as a feature for a training example based on the communication. For example, one or more of the probabilities may be utilized to determine a weight for the training example. In various implementations, the trained structured machine learning model is an expectation maximization trained conditional random field model that may optionally be trained via an expectation maximization algorithm.

In some implementations, a corpus of communications may be grouped into a plurality of clusters based on similarities between the communications and/or their metadata. For instance, flight itinerary emails from one airline may form one cluster; flight itinerary emails from another airline may form another cluster. A template may then be generated for each cluster, and a trained structured machine learning model generated and assigned to the template as described herein. Subsequent communications may be matched to a template using the same or similar technique as was used to initially group the corpus of communications into clusters. The template to which a subsequent communication is matched may dictate the trained structured machine learning model that is used to determine a semantic label for one or more transient fields of the subsequent communication.

In various implementations, one or more (e.g., all) aspects of techniques described herein may be performed without human access to one or more (e.g., all) communications utilized in performing the techniques. For example, segments of a cluster of communications may be classified as either transient or fixed without human access to those communications. Also, for example, transient segments of a plurality of transient segments of a communication may be annotated with corresponding semantic labels utilizing a classifier and without human access to those communications. As yet another example, training examples may be generated based on communications and utilized to train a structured machine learning model without human access to those communications.

Implementations disclosed herein propose a hybrid approach to determine, for one or more transient segments, a corresponding probability that a given semantic label is the correct semantic label for extracted content of the transient segment(s). The hybrid approach may generally comprise training a structured machine learning model (e.g., a conditional random field model) for a template using training examples that include one or more semantic labels for one or more transient segments that are predicted by a classifier (e.g., a binary classifier). The semantic labels are predicted by the classifier based on properties of communications that conform to the template. In some of those implementations, an expectation maximization (EM) algorithm is optionally utilized in training the structured machine learning model to remove noise and/or improve accuracy. Implementations disclosed herein may improve accuracy, precision, and/or recall of applying correct semantic labels to transient segments of communications—and may be utilized for various semantic labels such as those that are indicative of product names, event names, formal names, order confirmation numbers, order numbers, customer numbers, product numbers, and so forth.

In some implementations, a computer implemented method may be provided that includes the steps of: grouping a corpus of electronic communications into a plurality of clusters based on metadata associated with each communication; identifying, from communications of a particular cluster, a set of segments; classifying a plurality of the segments of the set of segments as transient segments, wherein classifying a given segment of the segments as a transient segment is based on variability of content of the given segment across the particular cluster, and wherein the classifying is performed without human access to content of the communications; generating a template for the cluster that defines an order of the transient segments; for each communication of a training set of the communications of the particular cluster, annotating each of one or more of the transient segments with at least one corresponding semantic label, the annotating performed without human access to the content of the communications; generating training examples that each define a plurality of features for a corresponding one of the communications of the training set, the features including at least the annotated semantic labels for the transient segments and the order for the transient segments; and training a structured machine learning model for the template using the training examples, the trained structured machine learning model defining parameters for determining, for one or more of the transient segments, a corresponding probability that a given semantic label of the semantic labels is a correct label.

In some implementations, a computer implemented method may be provided that includes the steps of: identifying, by one or more processors, metadata of an email; comparing, by one or more of the processors, the metadata of the email to indexed content of a plurality of templates; selecting by one or more of the processors, a matched template of the templates based on the comparing, the matched template defining locations of transient segments in the email; identifying, by one or more of the processors, a trained structured machine learning model assigned to the matched template, the trained structured machine learning model defining parameters for determining a probability that a semantic label is a correct label for a given transient segment of the transient segments; identifying, by one or more of the processors, the given transient segment in the email; extracting, by one or more of the processors, content from the electronic communication that is included in the given transient segment; applying, by one or more of the processors, the trained structured machine learning model to the email to determine the semantic label is a correct label for the content; and assigning, by one or more of the processors, the semantic label to the extracted content based on the determination that the semantic label is the correct label for the given transient segment.

In some implementations, a computer implemented method may be provided that includes the steps of: grouping a corpus of electronic communications into a plurality of clusters based on metadata associated with each communication; identifying, from communications of a particular cluster, a set of segments; classifying a plurality of the segments of the set of segments as transient segments, wherein classifying a given segment of the segments as a transient segment is based on variability of content of the given segment across the particular cluster, and wherein the classifying is performed without human access to content of the communications; generating a template for the cluster that defines an order of the transient segments; for each communication of a training set of the communications of the particular cluster: providing, as input to a classifier, one or more properties of content of a given transient segment in the communication, receiving, as output from the classifier, a probability that a given semantic label is correct for the given transient segment for the communication, and annotating, for the communication, the given transient segment with the given semantic label and a probability of the given semantic label; generating training examples that each define a plurality of features for a corresponding one of the communications of the training set, the features including at least the order for the transient segments, semantic labels for each of the transient segments for the communication, and a weight for the training example that is based at least in part on the probability for the communication; training a structured machine learning model for the template using the training examples, the trained structured machine learning model defining parameters for determining, for one or more of the transient segments, a corresponding probability that a given semantic label of the semantic labels is a correct label; and assigning the trained structured machine learning model to the template for application to additional communications that match the template to determine the probability that the given semantic label is a correct label for content of one of the transient segments in the additional communication.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
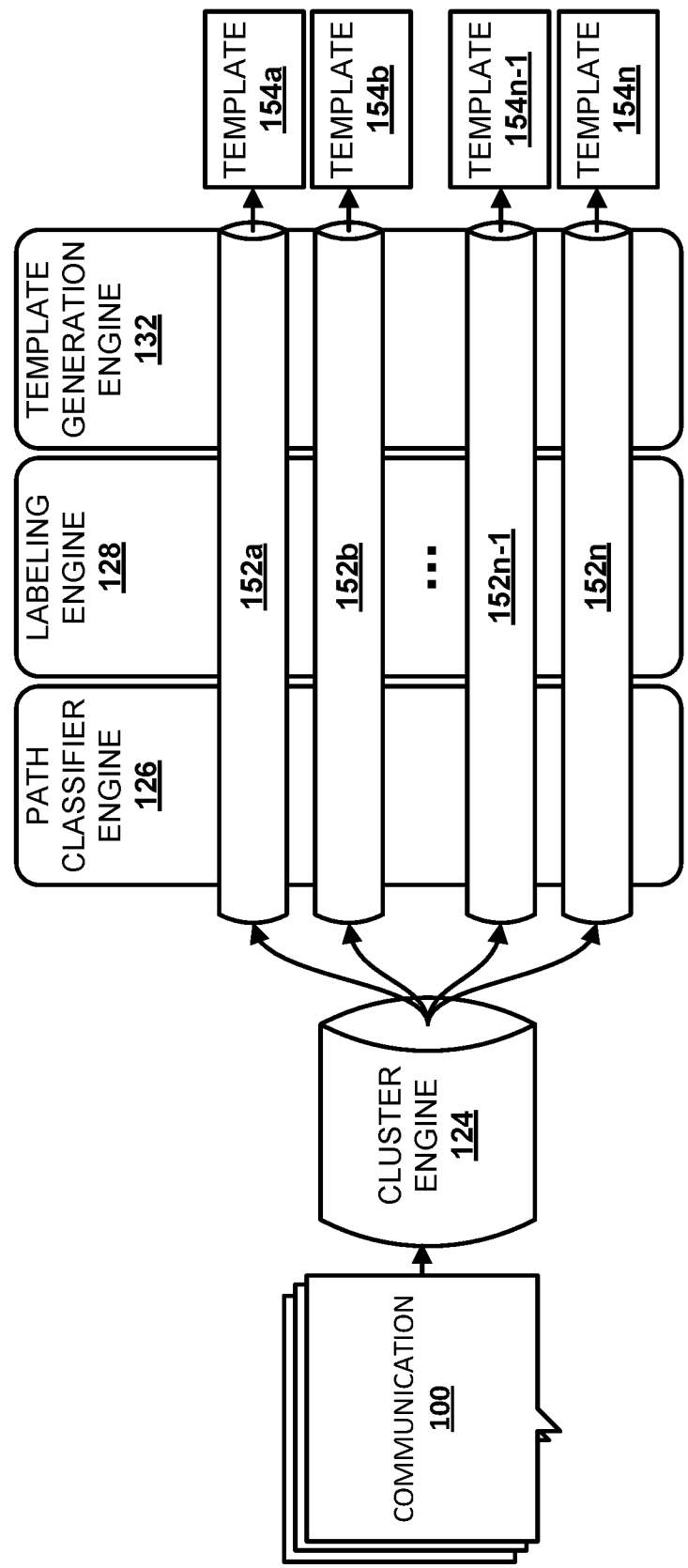
FIG. 1A illustrates an example of how a corpus of communications may be analyzed by various components of the present disclosure to generate one or more templates.

FIG. 1A illustrates an example environment in which a corpus of communications 100 may be grouped into clusters 152$a$-$n$, and in which clusters of communications may be analyzed to generate templates 154$a$-$n$. As used herein, a "communication" may refer to an email, a text message (e.g., SMS, MMS), an instant message, or any other communication, particularly B2C communications, that are typically (but not always) automatically generated. In various implementations, one or more communications may be "structured communications" that are structured using various markup languages such as the Extensible Markup Language ("XML") or the Hypertext Markup Language ("HTML"), though this is not required. In various implementations, a communication 100 may include various metadata. For instance, emails may include one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 124 may be configured to group the corpus of communications 100 into a plurality of clusters 152$a$-$n$ based on one or more patterns shared among one or more communications 100 within the corpus. In some implementations, cluster engine 124 may have one or more preliminary filtering mechanisms to discard communications that are not suitable for template generation. For example, if a corpus of communications 100 under analysis includes personal emails and B2C emails, personal emails may be discarded. Cluster engine 124 may utilize various aspects of communications 100 to group B2C and other similar communications into clusters, such as metadata, formatting information (e.g., HTML nodes, XPaths, etc.), textual similarities, byte similarities, and so forth. In some implementations, cluster engine 124 may use metadata such as a sending entity or a subject of email, alone or in combination, to select a cluster to which the email belongs.

Cluster engine 124 may use various techniques to perform communication clustering. In some implementations, cluster engine 124 may be configured to analyze an email subject using one or more regular expressions. For example, emails from a particular sending entity (which may include emails from more than one email address) may be analyzed to determine a frequency of words found in the emails' subjects. Words satisfying a particular criterion (e.g., a frequency threshold) may be considered "fixed." Words that do not satisfy the criterion may be considered "transient." In some implementations, the emails' subjects may then be analyzed again to generate regular expressions. Fixed terms may remain unchanged in the regular expressions (e.g., represented as "constants"). Transient words/terms may be replaced with regular expression wildcards. In some implementations, each element of the set of unique regular expressions may represent a unique cluster. An email may be assigned to a cluster associated with a regular expression that best matches the email's subject. A cluster may be considered a "best match" for an email based on various metrics, such as the cluster having the longest matching regular expression for the email's subject.

Additionally or alternatively, communications such as emails may be clustered based on structural similarities. For example, a set of XPaths for an email (e.g., a set of addresses to reach each node in the email's XML node tree) may be independent of the email's textual content. Thus, the similarity between two or more such emails may be determined based on a number of shared XPaths. An email may be assigned to a particular cluster based on the email sharing a higher number of XPaths with emails of that cluster than with emails of any other cluster. Additionally or alternatively, two emails may be clustered together based on the number of XPaths they share compared to, for instance, a total number of XPaths in both emails.

In some implementations, communications such as emails may be clustered additionally or alternatively based on textual similarities. For example, emails may be analyzed to determine shared terms, phrases, ngrams, ngrams plus frequencies, and so forth. Based on these data points, emails may be clustered. For example, emails sharing a particular number of shared phrases and ngrams may be clustered together.

In some implementations, emails may even be grouped into clusters based on byte similarity. For instance, emails may be viewed as strings of bytes that may include one or both of structure (e.g., metadata, XPaths) and textual content. In some implementations, a weighted combination of two or more of the above-described techniques may be used as well. For example, both structural and textual similarity may be considered, with a heavier emphasis on one or the other.

Once a corpus of communications are grouped into clusters 152a-n, each cluster may contain communications that are highly likely to include the same boilerplate and structure, and to have transient data (which may be the primary data of interest for extraction) in approximately the same locations (e.g., spatially and/or in terms of the same XPath). Path classifier engine 126, semantic classifier engine 128, and template generation engine 132 may then perform various downstream processing to produce templates 154a-n for clusters 152a-n.

Path classifier engine 126 may be configured to identify, from communications of a particular cluster 152, a set of segments. As used herein, a "segment" may refer to an address to reach a node in a communication. In implementations in which the communications of a particular cluster 152 are structured communications, the address may be a markup language node, such as an XPath. In implementations in which the communications of a particular cluster 152 are non-structured plain text, the address may be a tree location node, such as a node in a hierarchical tree (e.g., a parse tree) that segments plain text based on one or more criteria. In some implementations, path classifier engine 126 may collect all segments from all communications in a particular cluster 152 into a set. Path classifier engine 126 may then classify the segments in the set in various ways depending on the nature of text or other data that are associated with the segments.

For example, in some implementations, path classifier engine 126 may classify a segment underlying a segment of text that is not shared among all emails (e.g., a recipient's name, address, phone number, a particular departure or arrival time, a purchased product, a purchase price, and so forth) of a cluster as "transient." In some implementations, path classifier engine 126 may classify a particular segment underlying a particular segment of text as transient in response to a determination, e.g., by path classifier engine 126, that a count of occurrences of the particular segment of text across the particular cluster satisfies some criterion (e.g., a frequency threshold).

By contrast, path classifier engine 126 may classify another segment that is associated with a segment of text that is shared among all (or most) communications of the cluster as "fixed" (e.g., boilerplate). In various implementations, path classifier engine 126 may classify a particular segment associated with a particular segment of text as fixed in response to a determination, e.g., by path classifier engine 126, that a count of occurrences of the particular segment of text across the particular cluster fails to satisfy the aforementioned threshold, or satisfies another threshold. Various criteria may be used to determine that a segment underlying a particular segment of text is transient or fixed, such as a minimum/maximum threshold (e.g., if the segment of text is found in less or more than a particular number of emails in a cluster, or in a percentage of the emails that is above or below a threshold).

Suppose a particular segment of text such as a specific departure time (e.g., May 1, 2015 at 8:00 am) or a specific product purchased (e.g., "Acme model 35986 Box Wrench") is only shared among a small number of emails in a cluster (or even only in a single email). That segment of text is not likely boilerplate, but instead is likely transient data of potential interest for extraction. Path classifier engine 126 may classify the segment underlying that segment of text as "transient." In contrast, another segment of text such as "Departure time:" or "Delivery Estimate:" that is repeated among numerous emails in a cluster may likely be boilerplate (although as noted below it may be used as a signal by labeling engine 128, classifier 160, and/or training engine 165). Path classifier engine 126 may classify the segment underlying that segment of text as "fixed."

In some implementations, path classifier engine 126 may construct a bipartite graph. Nodes in a first set may represent segments. Nodes in a second set may represent corresponding segments of text, with edges to the corresponding nodes in the first set. Edges between nodes in the first and second sets may be weighted, e.g., by a number of occurrences of a particular segment of text in association with a particular segment. The node pairs may be sorted by their edge weights, and those weights that satisfy a particular threshold (e.g., less than a predetermined weight or some other similar threshold) may be considered "transient." Node pairs having edges with weights that satisfy some other threshold (e.g., greater than the predetermined weight) may be considered "fixed."

Suppose a cluster of emails are from a particular airline and are meant to communicate itineraries to passengers. One segment (e.g., "/html/body/div/h3/") of the set of segments obtained from the emails of the cluster may be represented by a first node with a value, "/html/body/div/h3/". That first node may be connected to a textual node (e.g., "Departure Airport:") via an edge. That edge may have a weight that satisfies a threshold because most if not all emails of the cluster will likely include the text "Departure Airport:" in association with the same XPath. Accordingly, that first node (and its corresponding segment) may be classified as "fixed."

Another segment (e.g., "/html/body/div/p") of the set of segments obtained from the emails of the cluster may be represented by a second node with a value, "/html/body/div/p". That second node may be connected via numerous edges to numerous textual nodes representing strings of text describing different departure airports. Many of those edges may therefore have weights that that do not satisfy the aforementioned threshold, or that satisfy a different threshold (e.g., less than 5% of node pairs reflect that correspondence). Accordingly, that second node (and its corresponding segment) may be classified as "transient."

In some implementations where a bipartite graph is constructed, an algorithm such as the following may be implemented:

```
graph={ }
for each email in cluster
  for each XPath in email
    text=GetText(XPath)
    graph[text]=XPath
    graph[XPath]=text
  end for
end for
XPath_set=SortAllXPaths(graph)
```

A template (e.g., 154) may be generated from a bipartite graph generated using this algorithm. In some embodiments, a template 154 may include an ordered sequence of fixed segments, transient segments, and/or fixed segments of text.

In some embodiments, a particular textual node may have a frequency f that is equal to a number of times that textual string is observed across emails of a cluster. Textual nodes with frequencies f that satisfy a particular threshold or function may be classified as fixed. The following are examples of functions that may be used to classify a textual node as fixed or transient, with N being a positive integer that is equal to a number of emails in a cluster:

A textual may be fixed where f/N>threshold
where $$\text{threshold} = \text{upper\_limit} - \frac{2}{3} \times \sqrt{\frac{N}{k}} \times (\text{upper\_limit} - \text{lower\_limit})$$

"upper_limit" may be a maximum fraction or percentage of communications to consider something fixed. For example, if upper_limit is equal to 0.2, then every segment of text that appears in more than 20% of communications of a cluster is considered fixed. "lower_limit" may be a minimum fraction or percentage of communications to consider something fixed. For example, if lower_limit is equal to 0.01, then every segment of text that appears in less than 1% of communications of a cluster is considered transient. k may be a constant selected based on various criteria. In some implementations, k may be a number of communications at which a curve representing the threshold peaks, flattens, and even begins decreasing. For example, if a cluster includes a relatively large number of emails, then k may be reduced. "min_occurrence_ratio_range" may be a difference between a maximum percentage allowed and a minimum percentage allowed.

Labeling engine 128 is optional and may be configured to determine certain semantic labels to be assigned to one or more of the transient segments classified by path classifier engine 126. Labeling engine 128 may make these determinations based on various signals, and may optionally only assign a semantic label to a transient segment when it is determined with high confidence to be a correct semantic label for the transient segment. Some signals may be associated with communications of a particular cluster of communications, and may include things like metadata (e.g., sending entity, textual patterns in subjects, etc.) and content of communications, particularly segments of text associated with segments that are considered "fixed."

One example signal that may be used by labeling engine 128 is a context of the communications of a particular cluster. Suppose the cluster includes emails from a particular airline reporting itineraries to passengers. That general context may enable semantic classifier engine 128 to search for cues that might typically be located in such emails, such as words like "Departure," "Depart," etc., particularly in combination with other cues, such as a colon following a particular word. For example, one or more fixed segments of text contained in communications of the cluster within a particular distance of a particular segment of text may be analyzed to determine what the particular segment of text is meant to communicate. If a transient XPath underlying a segment of text, "May 1, 2015 at 8:00 am," is immediately preceded by a fixed XPath underlying a segment of text, "Depart," and particularly if a colon or dash is between them, then labeling engine 128 may assign a semantic label indicative of Departure Date/Time to the transient XPath. Additionally or alternatively, semantic classifier engine 128 may assign a semantic data type to a particular transient segment based on one or more patterns in segments of text associated with the transient segment (e.g., "MM/DD/YY," "MM/DD/YYYY," "$dd,ddd.dd," etc.). In various implementations, semantic classifier engine 128 may use one or more regular expressions and/or heuristics in determining and/or assigning semantic labels to one or more of the transient segments.

In some implementations, labeling engine 128 may employ various techniques to protect information users may consider sensitive or otherwise confidential. For example, labeling engine 128 may classify (or reclassify) one or more segments, previously classified as transient, as "confidential." In subsequent processing of communications, segments of text associated with transient, but confidential, segments may be ignore or otherwise discarded. Labeling engine 128 may classify (or reclassify) a particular segment as confidential based on various signals. For example, sensitive data like credit card numbers or social security numbers may have known numeric patterns that labeling engine 128 may recognize.

Template generation engine 132 may be configured to generate one or more templates 154a-n, e.g., based on the classified segments provided by path classifier engine 126 and/or semantic classifier engine 128. Those templates may be usable by various components to, for example, determine an order of segments, determine whether the segments are transient or fixed, and/or to determine text included in one or more of the segments. The templates may additionally and/or alternatively be usable to, for example, extract, from one or more subsequent communications, one or more segments of text associated with transient (and in some cases, non-confidential) segments. In some implementations, a template generated by template generation engine 132 may define the text in fixed regions, the locations of the fixed regions (e.g., the XPath), the locations of the transient regions (e.g., the XPath), and/or semantic labels of the transient regions assigned by the labeling engine 128.

Operations performed by cluster engine 124, path classifier engine 126, semantic classifier engine 128, signal engine 130 and/or template generation engine 132 may be performed on individual computer systems, distributed across multiple computer systems, or any combination of the two. These one or more computer systems may be in communication with each other and other computer systems over one or more networks (not depicted).

Figure 1B:
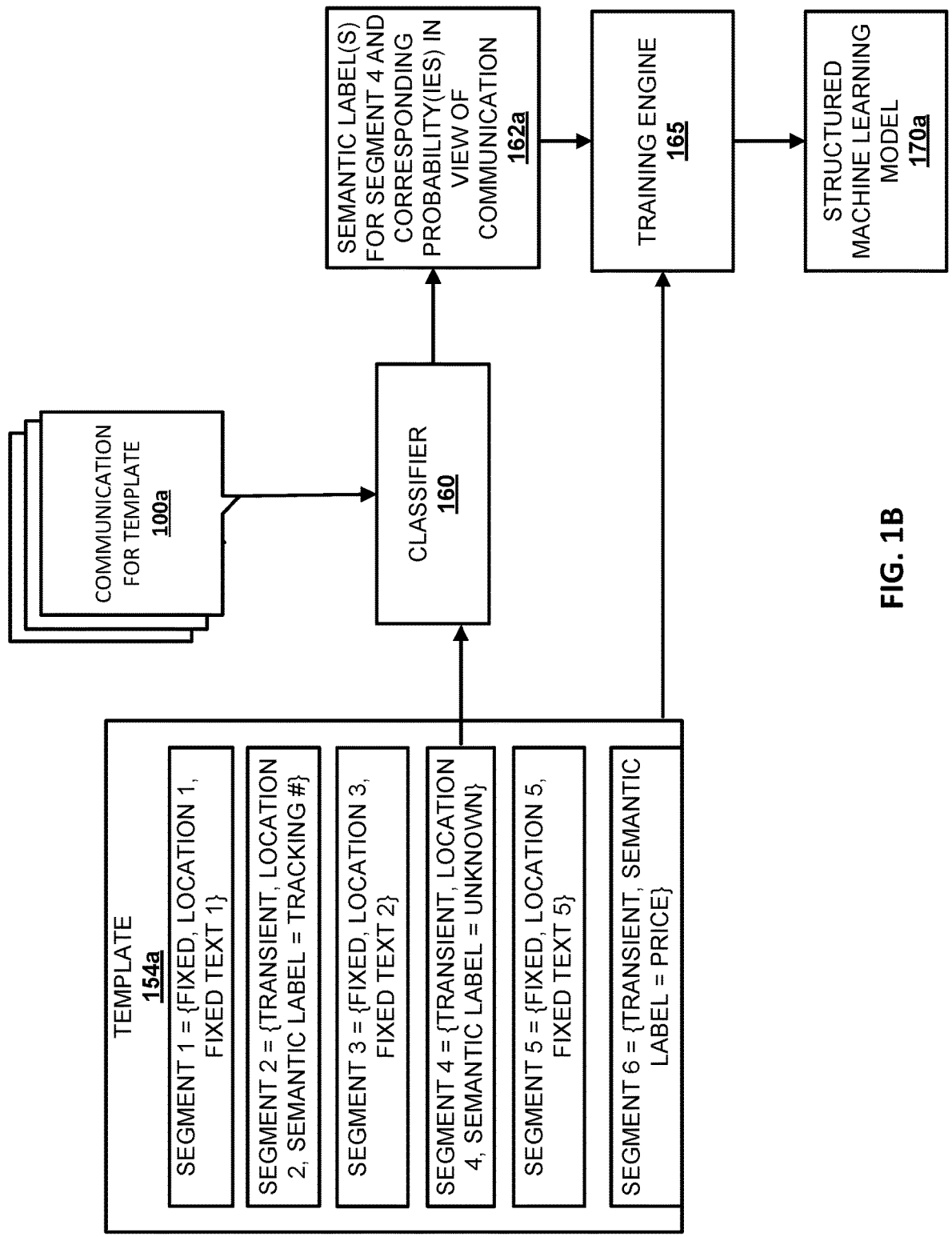
FIG. 1B depicts an example of how a structured machine learning model may be trained for a template based on training examples generated in view of communications that conform to the template.

FIG. 1B depicts an example of how a trained structured machine learning model may be trained for template 154a based on training examples generated in view of communications 100a that conform to the template. Template 154a is provided as an example only, and other templates may present data in different formats, include additional and/or alternative data, and/or otherwise vary from the example template 154*a*. Each of the fixed segments of the template 154*a* of FIG. 1B is defined by a tuple that includes the classification of the segment (fixed), a location of the segment (e.g., "location 1" (e.g., an XPath) for "segment 1"), and the fixed text for the segment (e.g., "fixed text 1" for "segment 1"). Each of the transient segments of the template 154*a* is defined by a tuple that includes the classification of the segment (transient), a location of the segment (e.g., "location 2" (e.g., an XPath) for "segment 2"), and a semantic label (if known) for the segment (e.g., "tracking #" for "segment 2"). The locations of the segments defines the order of the segments relative to one another.

In FIG. 1B, the semantic label for transient "segment 4" is "unknown." The semantic labels for the other transient segments are all "known." For example, they may have been determined and annotated for those transient segments by label engine 128 as described with respect to FIG. 1A. In other implementations, multiple (e.g., all) transient segments of a template may be "unknown."

A plurality of communications 100*a* for the template 154*a* are also illustrated in FIG. 1B. The communications 100*a* are communications from the corpus that "match" the template 154A and that are selected as a "training set" of communications. For example, the communications 100*a* may include one or more (e.g., all) of the communications that were utilized to generate the template 154*a* and/or may be matched to the template 154*a* (e.g., by the cluster engine 124) using the same or similar technique as was used to initially group the corpus of communications into the cluster utilized to generate the template 154A.

For each of a plurality of the communications 100*a*, the classifier 160 determines at least one semantic label for "segment 4" and one or more corresponding probabilities for each semantic label in view of the communication 100*a*. For example, the classifier 160 may be configured to receive, as input, one or more properties related to a segment, and generate, as output: 1) a probability that a given semantic label is the correct label for the segment; and/or 2) a probability that the given semantic label is the incorrect label for the segment (i.e., the probability that the correct label is "other"). As described in more detail below, the properties that are related to the segment of a communication that are provided as input to the classifier 160 may include properties related to the content of the segment in the communication, properties related to context of the segment in the communication, among others. Thus, the classifier 160 provides output in view of one or more properties related to the segment for the communication being analyzed.

As one specific example, classifier 160 may be trained to generate as output: a probability that "product" is the correct semantic label for the segment. Based on properties related to the segment in a first communication of the communications 100*a*, the classifier 160 may provide output 162*a* of "0.8." Based on properties related to the segment in a second communication of the communications 100*a*, the classifier 160 may provide output 162*a* of "0.7."

Each output 162*a* from the classifier 160 is provided to the training engine 165 and the training engine 165 generates a plurality of training examples for the template 154*a*. Each of the training examples is based on one of the communications 100*a* and includes one or more features based on a corresponding output 162*a* provided by the classifier 160 and one or more features based on the template 154*a* that are considered as features for the communications 100*a* based on them matching the template 154*a*. For example, each training example may be an array of elements, with: a first element in the array defining one or more features for segment 1 of the template 154*a*; a second element in the array defining one or more features for segment 2 of the template 154*a*; a third element in the array defining one or more features for segment 3 of the template 154*a*; a fourth element in the array defining one or more features for segment 4 of the template 154*a*; a fifth element in the array defining one or more features for segment 5 of the template 154*a*; and a sixth element in the array defining one or more features for segment 6 of the template 154*a*.

For example, and continuing with the example above, first and second training examples may be generated based on the output 162*a* of "0.8" and based on the template 154*a*. For instance, the training engine 165 may generate the first training example by annotating the "product" semantic label as a feature for transient segment 4 and may assign a weight for the training example that is based on the probability of "0.8". Also, for instance, the training engine 165 may generate the second training example by annotating a "non-product" semantic label as a feature for segment 4 and may assign a weight for the training example that is based on the probability of "0.2" (e.g., deduced by the training engine based on the probability of "0.8" that is a product). Other features between the first and second training example may be the same. For example, each of the training examples may include features of: the order of segments 1-6; that segments 1, 3, and 5 are fixed; the fixed text of segments 1, 3, and 5; the semantic labels of segments 2 and 6; and/or the text of segments 2 and 6 in the communication on which the output of "{product, 0.8; non-product, 0.2}" was generated. Note that the semantic labels of segments 2 and 6 may be considered to be "annotated" for the corresponding communication based on them being defined in template 154*a* as semantic labels for transient segments of all communications that conform to the template.

Still continuing with the example above, third and fourth training examples may also be generated based on the output 162*a* of "0.7" and based on the template 154*a*. For instance, the training engine 165 may generate the first training example by annotating the "product" semantic label as a feature for transient segment 4 and may assign a weight for the training example that is based on the probability of "0.7". Also, for instance, the training engine 165 may generate the second training example by annotating the "non-product" semantic label as a feature for segment 4 and may be assigned a weight that is based on the probability of "0.3" (e.g., deduced based on the probability of "0.7"). Other features between the third and fourth training example may be the same. However, note that in some implementations one or more of the other features for the third and fourth training example may vary relative to the corresponding features for the first and second training examples. For example, where features for fixed text and/or transient text are included, one or more of those features for a given training example may be determined in view of the communication 100*a* on which the given training example is based—and such features may vary between communications.

The training engine 165 trains structured machine learning model 170*a* using the generated training examples. Various structured learning techniques may be utilized for the training depending on desired accuracy, computational costs, time, and/or other factors. Generally, the training engine 165 trains structured machine learning model 170*a* by utilizing each of the generated training examples as observed data to iteratively adjust the parameters of the structured machine learning model 170a. As described in more detail in FIG. 2 below, the trained structured machine learning model 170a is assigned to the template 154a and includes trained parameters that can be used to determine, for one or more transient segments of template 154a, a corresponding probability that a given semantic label is a correct label.

The structured machine learning model 170a is a structured prediction model that, once trained, can be used to predict the semantic label sequence for one or more (e.g., all) transient segments in a sequence. Various structured prediction models and/or algorithms may be utilized such as, for example, Bayesian networks, random fields, inductive logic programing, structured support vector machines (SVMs), constrained conditional models, and/or Markov networks. One non-limiting example of a conditional random field model is described in detail herein.

In some implementations, classifier 160 may be trained to receive one or more features related to a textual segment as input and to generate a conditional class probability as output. The input features may include, for example, content based features (e.g., the number of words in the segment, number of digits in the segment, whether the segment has a hyper-link, whether the segment is in a table), context based features (e.g., distance to other segments such as distance to another segment with a particular semantic label, distance to a segment that is in a table header), search based features (e.g., features of search results that are returned in response to a search based on the textual segment), and/or knowledge based features (e.g., features related to properties of named entities in the text). In some of those implementations, the classifier 160 may be trained using training examples generated based at least in part on human annotated documents, such as one or more emails and/or other communications that have been "donated" by one or more users and approved by those users for human review. In some implementations, the documents on which the training examples are generated may optionally include, or be restricted to, documents that share a particular classification (e.g., "purchase emails", "travel emails", or "event emails"), though this is not required. The classifier 160 may take any one of various forms, such as a classifier that utilizes: logistic regression, classification and regression trees (CARTS), multivariate adaptive regression splines (MARS), generalized boosted regression models (GBM), random forests, or an unstructured support vector machine (SVM).

Although only a single classifier 160 is illustrated in FIG. 1B, in some implementations multiple classifiers may be provided. For example, in some implementations first and second classifiers may be provided and the first classifier may be trained to predict probability of a first semantic label (e.g., product) and the second classifier maybe trained to predict probability of a second semantic label (e.g., customer name). In some of those implementations, additional training examples may be generated based on the additional classifier and the structured machine learning model may be trained for a larger set of potential semantic labels. For example, for a given communication, a first training example may include the first semantic label as a feature for one or more of the segments and a first weight for the training example based on output from the classifier. A second training example for the given communication may include the second semantic label as a feature for the segments and a second weight for the second training example based on output from the second classifier.

Also, although FIG. 1B only depicts one "unknown" transient segment, in many implementations, the classifier 160 may provide conditional probabilities of a semantic label for a plurality of unknown transient segments of a template in view of input features for a communication that conform to that template. For example, another template may include a first unknown transient segment and a second unknown transient segment. The classifier 160 may determine, based on a communication that conforms to the template and for each of the unknown transient segments: 1) a probability that a given semantic label is the correct label for the segment; and/or 2) a probability that the given semantic label is the incorrect label for the segment. In some of those implementations, the training engine 165 may generate four separate training examples based on the output from classifier 160. The first training example may annotate both unknown transient segments as "correct", the second may annotate both unknown transient segments as "incorrect", the third may annotate the first segment as "correct" and the second segment as "incorrect", and the fourth may annotate that the second segment is "correct" and the first segment is "incorrect." Further, the training engine 165 may assign weights to each of the training examples based on the probabilities provided by classifier 160 for the annotations of each of the training examples. For example, for the third training example (first segment correct, second segment incorrect), the weight may be based on a probability that the semantic label is correct for the first segment and a probability that the semantic label is incorrect for the second segment. For instance, the two probabilities may be multiplied together and the product utilized as the weight.

With continuing reference to FIG. 1B, a non-limiting example of training structured machine learning model 170a is provided, where the structured machine learning model 170a is a conditional random field machine learning model.

Assume that classifier 160 is a binary classifier and that any additional classifiers (e.g., to predict probability of different semantic labels) are also binary classifiers. For example, for a given segment (e.g., transient segment) each of the classifiers estimates the probability of the segment being a number, a product name, a date or other semantic label. In other words, for each segment i for document (e.g., communication) $x_j$, the probability $$\pi_{ij} := p_{weak}(y_i = y_i^* | i, x_j) \quad (1)$$

indicates the probability of the label $y_i$ as inferred from a weak, low-accuracy classifier $p_{weak}$, being equal to the true label $y_i^*$. Note that is not necessary that these probabilities are properly normalized, as another form of normalization will be given in equation (10) below. However, in many implementations the probabilities should be bounded (e.g., from 0 to 1).

Equation (1) is converted into an actionable statistical model by treating the problem as one of observing the correct label (denoted as $t_i$=TRUE) with probability $\pi_{ij}$ for every position i, as specified by the classifier. In this case, the probability of inferring the correct labels for $x_j$ is given by $$p(\text{correct} | x_j, \theta) = \sum_{y_1, \ldots, y_n} \left[ \prod_{i=1}^{n} \pi_{ij} \right] p(y_1, \ldots, y_n | x_j, \theta) \quad (2)$$

where $y_1, \ldots, y_n | x_j, \theta)$ denotes a conditional random field machine learning model that models a nontrivial joint probability over annotations. It can be assumed that the correct label distribution factorizes, hence the $\prod_i \pi_{ij}$ term to capture the joint probability of the "inferred" labels $(y_1, \ldots, y_n)$ being correct.

Using a conditional random field machine learning model may enable exploitation of structural correlation between adjacent labels. This may be achieved by expressing the entire chain of labels as a conditional undirected graphical model by multiplying adjacent clique potentials. In other words, the conditional label distribution is given by an exponential family model $$p(y|x_j, \theta) = \exp(\langle \phi(x_j, \theta) - g(\theta|x_j) \rangle) \quad (3)$$

where $\varphi(x_i, y)$ is the feature function and the parameter $\theta$ acts as the coefficients of the features. Here $g(\theta|x_j)$ is the so-called conditional log-partition function ensuring that $p(y|x_j, \theta)$ is properly normalized as a distribution over y. $g(\theta|x_j)$ is a convex function in $\theta$ and computing $g(\theta|x_j)$ and its derivatives can be accomplished by dynamic programming. For this purpose the following equations may be exploited:

$$g(\theta | x_j) = \log \sum_y \exp(\langle \phi(x_j, y), \theta \rangle), \quad (4)$$

$$\partial_\theta g(\theta | x_j) = \sum_y \phi(x_j, y) \exp(\langle \phi(x_j, y), \theta \rangle - g(\theta | x_j)) \quad (5)$$

$$= E_{y \sim p(y|x_j, \theta)}[\phi(x_j, y)]. \quad (6)$$

Since the sufficient statistics $\emptyset (x_j, y)$ decomposes into terms on maximal cliques $(\ldots \emptyset y_i, x_j), \emptyset(y_i, y_i, x_j), \ldots )$, it is sufficient to have access to $p(y_i|x_j, \theta)$ and $p(y_i, y_{i+1}|x_j, \theta)$ if a chain conditional random field model is utilized. Both terms can be efficiently computed using dynamic programming for $E y_i|x_j, \theta[\emptyset(y_i, x_{ij})]$ and $E y_i y_{i+1})|x_j, \theta[\emptyset y_i, y_{i+1}, x_j)]$ respectively.

"Golden" human annotated labels for y* are not known. Rather, annotated labels for y* are only obtained via $\pi_{ij}$, as determined by a classifier. Accordingly, instead of utilizing the log-likelihood log $p(y|x_j, \theta)$ from equation (3), the log $\Sigma_y$ $[\prod_i \pi_{ij}]p(y|xj, \theta)$ from equation (2) may be utilized, which is a nonconvex objective function. More specifically, in the case of a conditional random field model the objective decomposes via $$\log \sum_y \left[ \prod_i \pi_{ij} \right] p(y | x_j, \theta) \quad (7)$$

$$= \log \sum_y \left[ \prod_i \pi_{ij} \right] \exp(\langle \phi(x_j, y), \theta \rangle) - g(\theta | x_j). \quad (8)$$

As can be seen, the first term is convex and the second is concave. Hence, for the purposes of maximizing the log-likelihood it can be upper-bounded by linearizing the first term via a Taylor approximation. This yields $$\log \sum_y \left[ \prod_i \pi_{ij} \right] p(y | x_j, \theta) \quad (9)$$

$$\geq c + \left\langle \theta, \partial_\theta \log \sum_y \left[ \prod_i \pi_{ij} \right] \exp(\langle \phi(x_j, y), \theta \rangle) \right\rangle - g(\theta | x_j)$$

-continued $$= c + \left\langle \theta, \sum_y q_i(y) \phi(x_j, y) \right\rangle - g(\theta | x_j),$$

where the distribution $q_j(y)$ is given by $$q_i(y) = \frac{\left[ \prod_i \pi_{ij} \right] \exp(\langle \phi(x_j, y), \theta \rangle)}{\sum_{y'} \left[ \prod_i \pi_{ij} \right] \exp(\langle \phi(x_j, y'), \theta \rangle)} \propto \left[ \prod_i \pi_{ij} \right] p(y | x_j, \theta). \quad (10)$$

Comparing equation (9) with equation (3), the likelihood calculation in (9) takes the weighted average of $\varphi(x_j, y)$ across the candidate labels y with respect to $q_j(y)$. In other words, the conditional label estimates are reweighted according to the outcomes of the low-accuracy annotators and the current conditional random field model prediction using the current weight $\theta$. Subsequently terms are renormalized.

Optimization proceeds by alternating between minimization of the upper bound of the log posterior over $\theta$ using the current estimate of label distribution $q_j(y)$ and by recomputing a new approximation $q_j(y)$ using the current estimate of weights $\theta$. Note that by construction the upper bound is tight at the point of expansion. This follows directly from Taylor expansions being exact at the point of expansion. To train the conditional random field model in the M-step (maximization step), a set of candidate labels are generated for each sequence and each are weighted using $q_j(y)$, and then use a standard convex solver to minimize (7). An $L_2$ penalty may optionally be added on the weights $\theta$ of the conditional random field model for regularization. In some implementations, an algorithm such as the following may be utilized in the inference procedure.

Require: Document set $\{x_j\}$
Require: Initial distributions $q_j(y)$, e.g. $q_j(y)$=const.
Initialize conditional random field model parameters $\theta$, e.g. $\theta$=0.
while not converged do
for each document $x_j$ do
E-step (Expectation Step): Update label distribution $q_j(y)$ via equation (10
end for
M-Step (Maximization Step): Train conditional random field model parameters $\theta$ minimizing (7)
end while
return $\theta$ Although a particular example of training structured machine learning model 170a is provided above, other techniques may be utilized. For example, in some implementations where the structured machine learning model 170a is a conditional random field machine learning model, a maximum likelihood estimation of the annotated labels for y* obtained via $\pi_{ij}$ may be used as an alternative to the expectation maximization approach described above. Also, for example, other structured machine learning models may be utilized instead of a conditional random filed machine learning model, such as one or more of those described herein.

Operations performed by classifier 160 and/or training engine 132 may be performed on individual computer systems, distributed across multiple computer systems, or any combination of the two. These one or more computer systems may be in communication with each other and other computer systems over one or more networks (not depicted).

Figure 2:
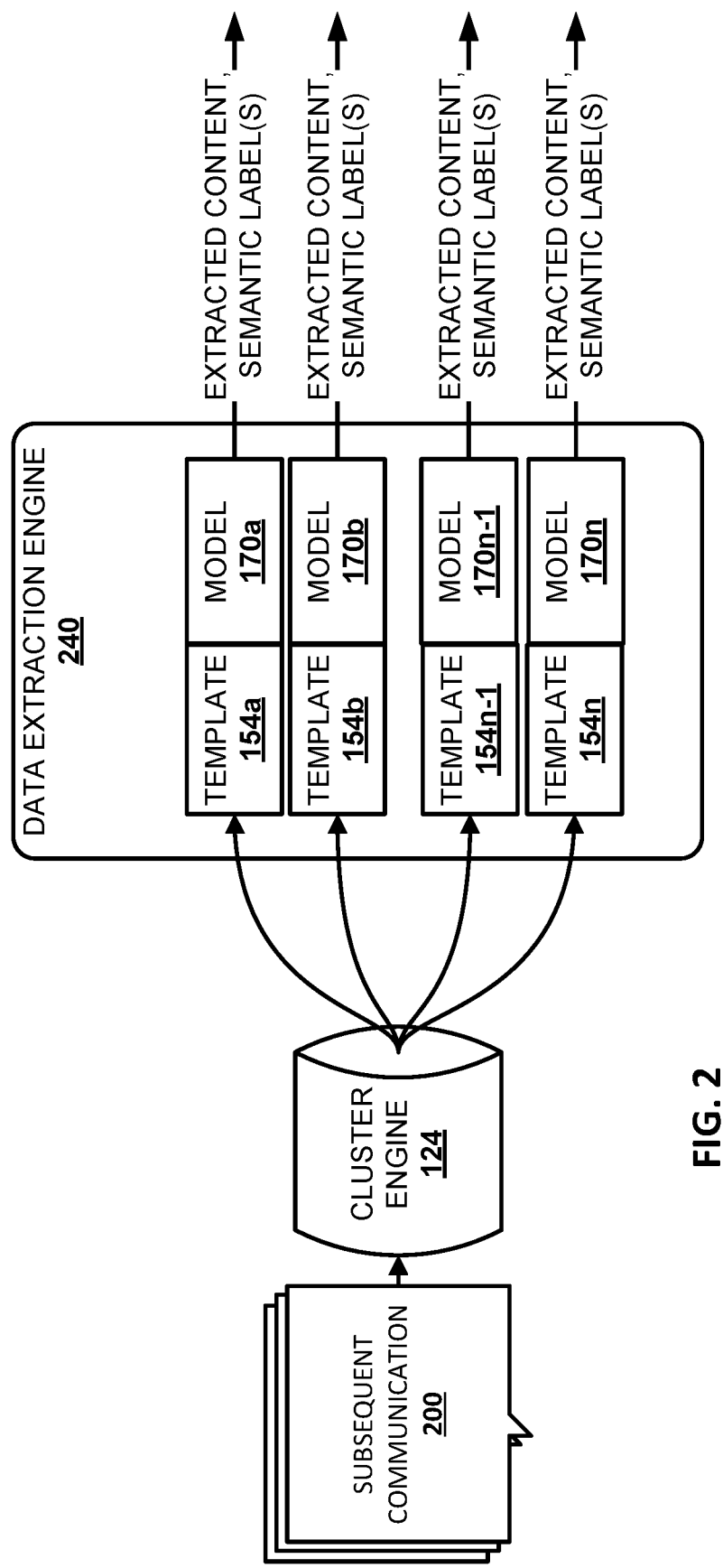
FIG. 2 illustrates an example of how content may be extracted from a subsequent communication using a template and how one or more semantic labels may be assigned to the content based on a structured machine learning model assigned to the template.

FIG. 2 depicts an example of how subsequent communications 200 may be analyzed after a plurality of templates 154a-n have been generated and a plurality of trained structured machine learning models 170a-n have been generated for corresponding of the templates 154a-n and assigned to corresponding of the templates 154a-n. Cluster engine 124 may be configured to employ techniques similar to those described above to determine which cluster structured communications 200 should be associated with. Based on that decision, a data extraction engine 240 may apply the extraction template (e.g., one of 154a-n) to the structured communication to extract the appropriate data. For example, data extraction engine 240 may utilize a particular template 154 to extract segments of text associated with non-confidential transient segments from the communication 200. Data extraction engine 240 may likewise ignore or discard segments of text associated with confidential and/or fixed segments.

Further, data extraction engine 240 may apply the structured machine learning model (e.g., one of 170a-n) assigned to the extraction template (e.g., a corresponding one of 154a-n) to determine semantic label(s) for content extracted from one or more of the transient segments. For example, the data extraction engine 240 may apply a particular corresponding model 170 to the communication 200 to determine, for each of one or more transient regions, a probability that each of one or more semantic labels is the correct semantic label for the transient region. The data extraction engine 240 may assign the semantic label to content extracted from the transient region when the probability satisfies a threshold, such a fixed threshold and/or a threshold relative to one or more probabilities (if any) determined for other semantic labels by applying the particular model 170. In some implementations, one or more semantic labels may be pre-assigned to certain transient segments in a template as described herein. In some of those implementations, the data extraction engine 240 may assign semantic labels to content extracted from those certain transient segments without requiring application of the model 170 to those certain transient segments (although the data extraction engine 240 may apply the model 170 to other transient segments to assign semantic labels to those transient segments). In other implementations, all semantic labels that are assigned to transient segments may be assigned based on application of the model 170 to those transient regions.

Figure 3A:
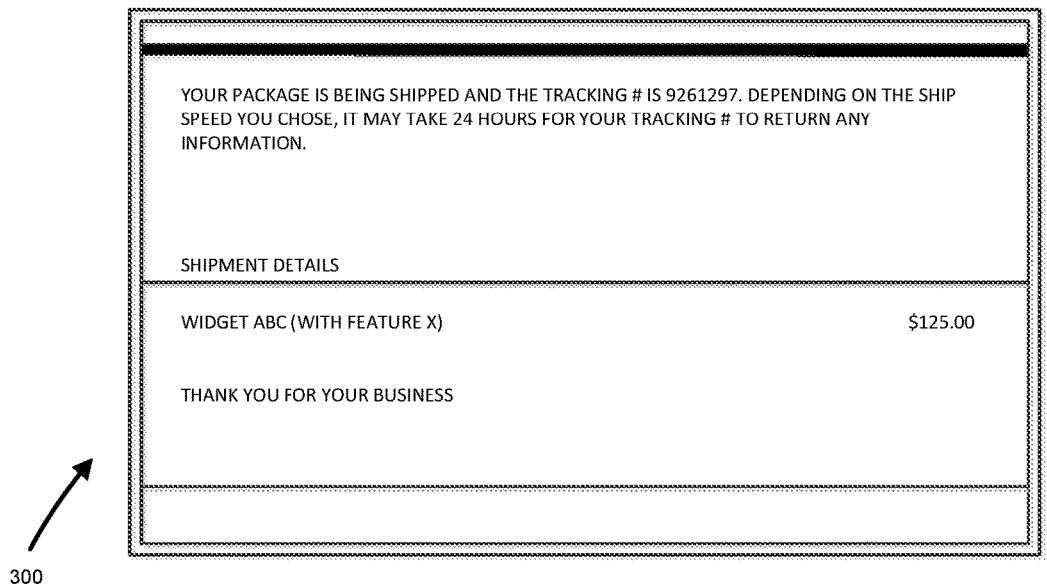
FIG. 3A depicts an example communication.
Figure 3B:
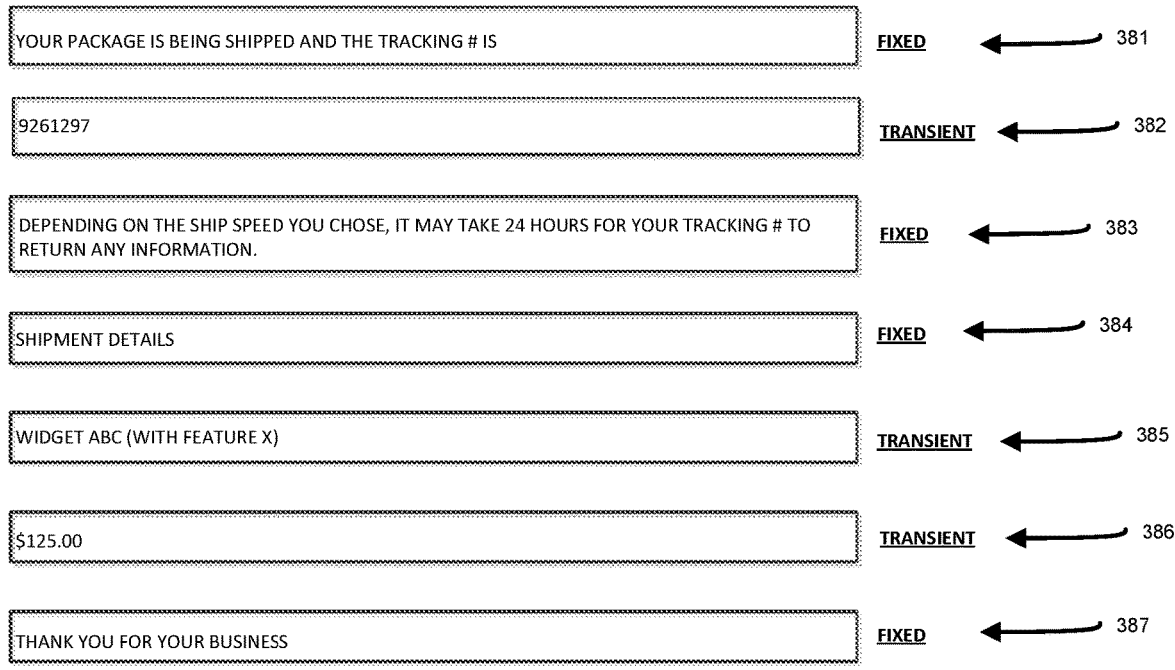
FIG. 3B depicts content of the communication of FIG. 3A broken into transient and fixed segments according to a template.

FIG. 3A depicts an example communication that is an email 300. FIG. 3B depicts content of the email 300 of FIG. 3A broken into transient and fixed segments 381-387 according to a template. With reference to FIGS. 3A and 3B, examples are described of how various portions of the email 300 may be classified, e.g., by path classifier engine 126, label engine 128, in accordance with various implementations. Email 300 may include various metadata, such as a recipient email address, a sender email address, a date received, and/or a subject.

Suppose email 300 is part of a corpus being used to generate one or more templates. As noted above, various metadata may be used to group email 300 into a cluster that includes other similar emails. In some implementations, a "sending entity" and/or a subject may be used to group email into a cluster with other emails with a similarly-structured subject and the same sending entity. A "sending entity" may not be limited to a single email address, but instead may refer generally to a source of communications (e.g., an airline, a retailer) that may utilize more than one email address to transmit B2C communications. For example, an airline may send itineraries from "customer_service@airline.com," "reminder@airline.com," "check-in@airline.com," and so forth. In various embodiments, various pattern recognition techniques such as regular expressions may be used to determine that a particular sender email address (e.g., "utopia_A2@utopiaair.com") is actually associated with a sending entity (e.g., Utopia Airways in this hypothetical).

Once email 300 is grouped with other similar emails in a cluster, a template may be generated for that cluster using various combinations of the techniques described herein. Transient content that is unlikely shared among more than a few emails of the cluster may be identified, e.g., by path classifier engine 126. For example, segments 382, 385, and 386 (FIG. 3B) may be considered transient because it is unlikely that more than a small fraction of the emails in the cluster will contain the exact same text associated with the segments underlying these segments of text. By contrast, segments 381, 383, 384, and 387 associated with underlying segments of text that are likely boilerplate shared among many or all emails of the cluster may be classified, e.g., by path classifier engine 126, as fixed.

Various fonts and/or symbols may be interpreted, e.g., by path classifier engine 126, as cues or hints as to whether a particular segment of text is transient or fixed. For example, presence of a semicolon, particularly if the next segment is transient, may be highly indicative that the segment of text is associated with a fixed segment. Other cues may include but are not limited to font, location, definition, synonyms, and so forth. In some embodiments, if fixed or transient text of an email tends to have a particular font (e.g., bold, italicized, etc.), then the fact that a yet-to-be classified segment of text has the same font as fixed or transient text may be probative of the segment underlying that segment of text being fixed or transient, as the case may be.

As noted above, various signals may optionally be used, such as content of a segment across multiple emails of a cluster, e.g., by labeling engine 128, to associate one or more semantic labels with one or more transient segments in the template. For example, the segment underlying "$125.00" may be classified as "price" based on, for example, inclusion of "$", inclusion of a numerical value (optionally with a "." that is followed by two numbers), and/or other signals.

Figure 3C:
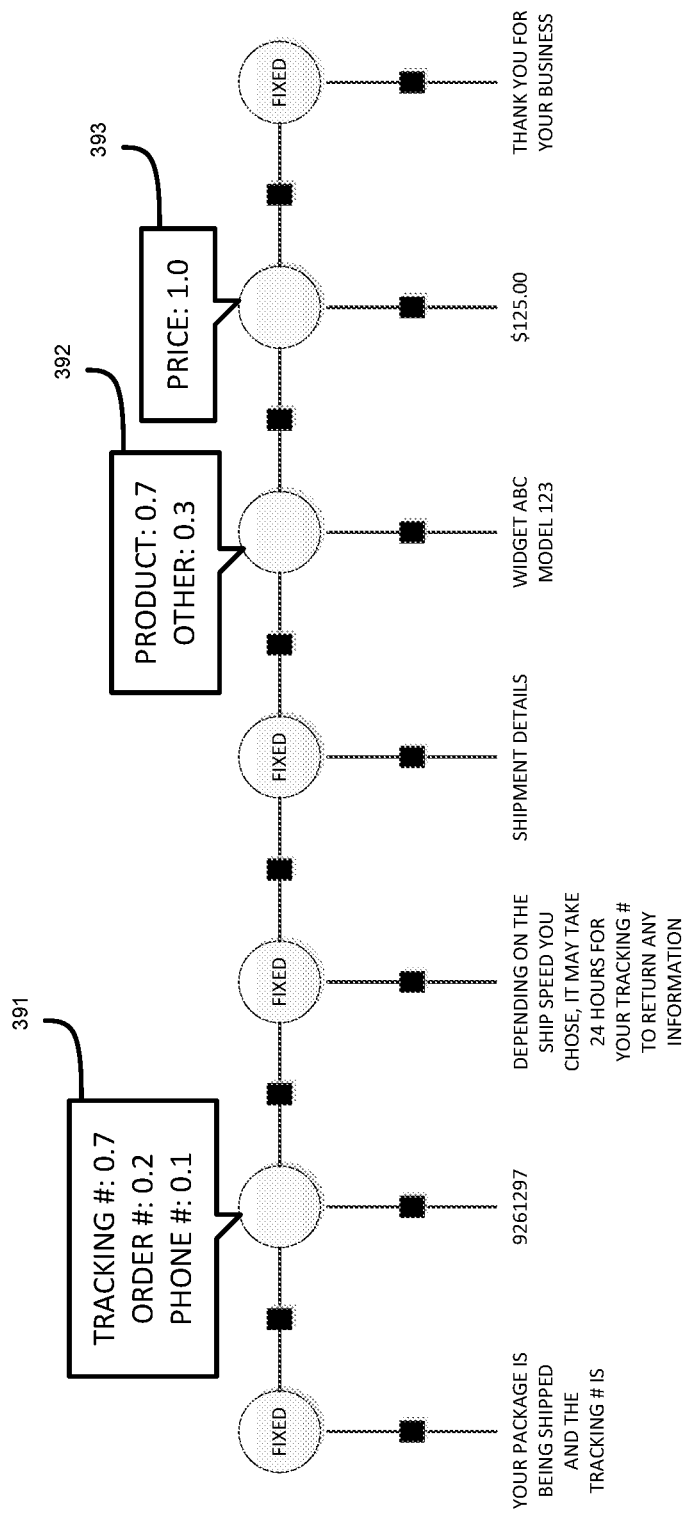
FIG. 3C depicts a structured model of the communication of FIG. 3A, with annotated semantic labels and corresponding probabilities for each of the transient segments.

FIG. 3C depicts a structured model 370 of the communication of FIG. 3A, with annotated semantic labels and corresponding probabilities for each of the transient segments. The structured model 370 is depicted as a chain with fixed segments indicated with circles and labeled with "fixed." Transient segments are indicated with unlabeled circles. The structure of the structured model 370 is indicated by lines extending between the nodes. The segments and structure of the structured model 370 is based on the template generated based on email 300 and/or other emails of a cluster. FIG. 3C also includes content from the email 300 for each of the nodes of the structured model 370, with content for each node depicted below the node and connected to the node with a vertical line.

FIG. 3C also includes indications 391-393 of semantic labels with probabilities for each of the transient segments. Indication 393 indicates a semantic label of "price" and a probability of "1.0" for the corresponding transient segment. In some implementations, the semantic label and probability may be determined by labeling engine 128 a described above and stored for the template based on, for example, regular expressions and/or heuristics. Indication 392 indicates semantic labels of "product" and "other"/non-product and corresponding probabilities of "0.7" and "0.3" for the corresponding transient segment. In some implementations, the semantic labels and probabilities of indication 392 may be determined based on providing features related to the corresponding transient segment to a first binary classifier trained to predict conditional probabilities of a segment referencing a "product", receiving the probability of "0.7" as output of the classifier and deducing the probability of "0.3" for other (i.e. "1.0-0.7").

Indication 391 indicates semantic labels of "tracking #", "order #", and "phone #" and corresponding probabilities of "0.7", "0.2", and "0.1" for the corresponding transient segment. In some implementations, the semantic labels and probabilities of indication 392 may be determined based on providing features related to the corresponding transient segment to one or more additional classifiers. For example, a single classifier may be trained to predict three probabilities, with a first being a probability that a segment references a "tracking #", a second being that the segment references an "order #", and the third being that the segment references a "phone #." As another example, three separate classifiers may be used, each trained to predict a probability for a respective of "tracking #", "order #", and "phone #", and the outputs from the three classifiers normalized to determine the probabilities of "0.7", "0.2", and "0.1".

Training engine 165 (FIG. 1B) may use one or more features of structured model 370 in generating one or more features for one or more training example for training the structured model 370, such as the labels and probabilities indicated by indications 391-393, locations of the transient and/or fixed segments, etc. Moreover, as described herein, training engine 165 may generate additional training examples based on additional emails and utilize those additional training examples in training the structured model 370.

Figure 4:
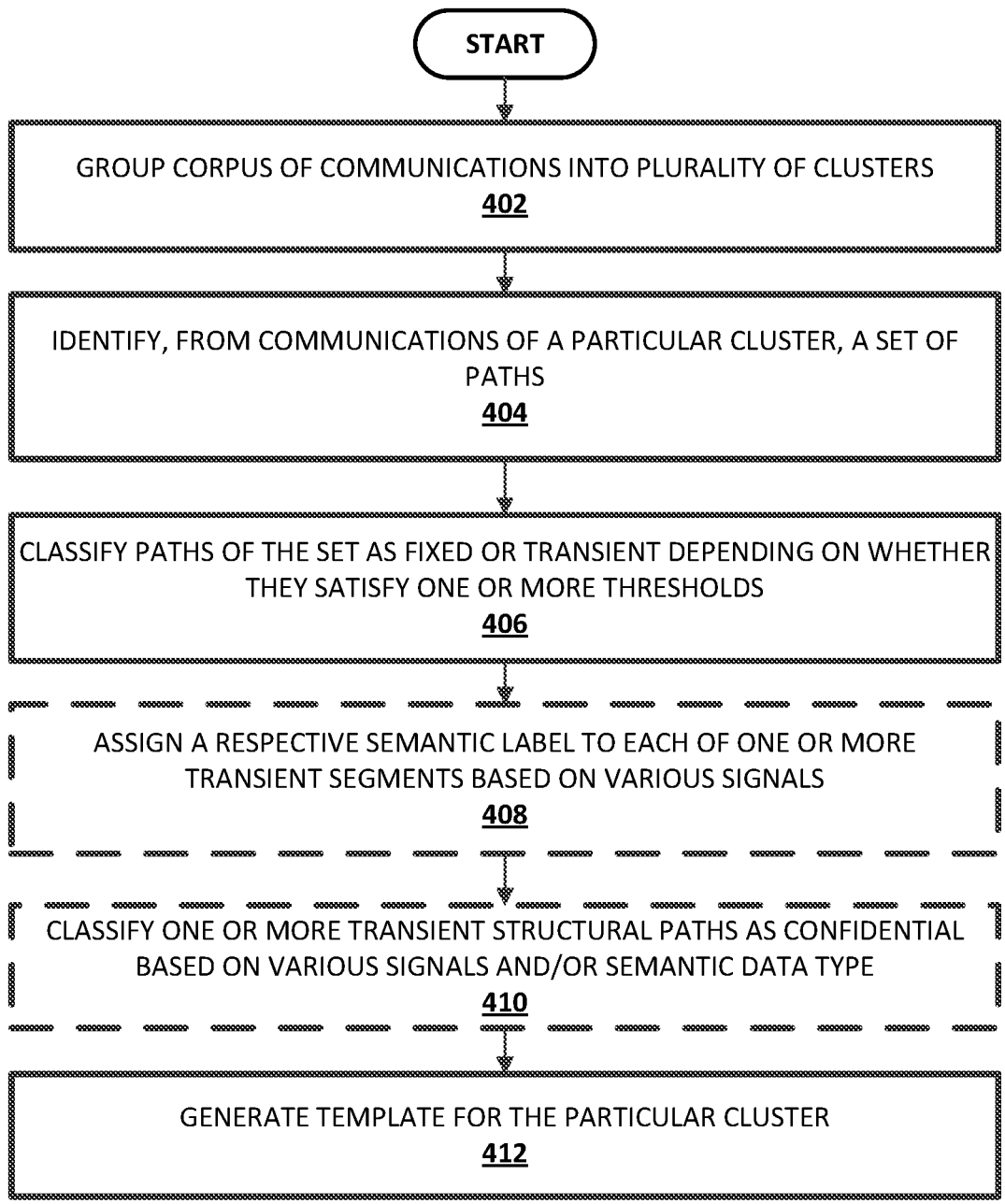
FIG. 4 depicts a flow chart illustrating an example method of generating a template for a cluster of communications.

Referring now to FIG. 4, an example method 400 of generating a template for a cluster of communications is described. For convenience, the operations of the flow chart are described with reference to a system that performs the operations. This system may include various components of various computer systems. Moreover, while operations of method 400 are shown in a particular order, this is not meant to be limiting. One or more operations may be reordered, omitted or added.

At block 402, the system may group a corpus of communications into a plurality of clusters, e.g., based on one or more pieces of metadata associated with each structured communication. For instance, a sending entity in combination with one or more textual patterns in an email subject may be used to select a cluster for an email. At block 404, the system may identify, from structured communications in a particular cluster, a set of segments (e.g., XPaths).

At block 406, the system may classify one or more segments of the set identified at block 404 as fixed or transient, e.g., depending on whether segments of text associated with each segment satisfies one or more thresholds or other criteria. At block 408, the system may optionally assign a respective semantic label to each of one or more segments classified as transient at block 406, e.g., based on various signals as described herein. At block 410, the system may optionally classify (or reclassify) one or more transient segments as confidential based on various signals.

At block 412, the system may generate a template for the cluster. As noted herein, the data extraction template may be usable for various purposes.

Figure 5:
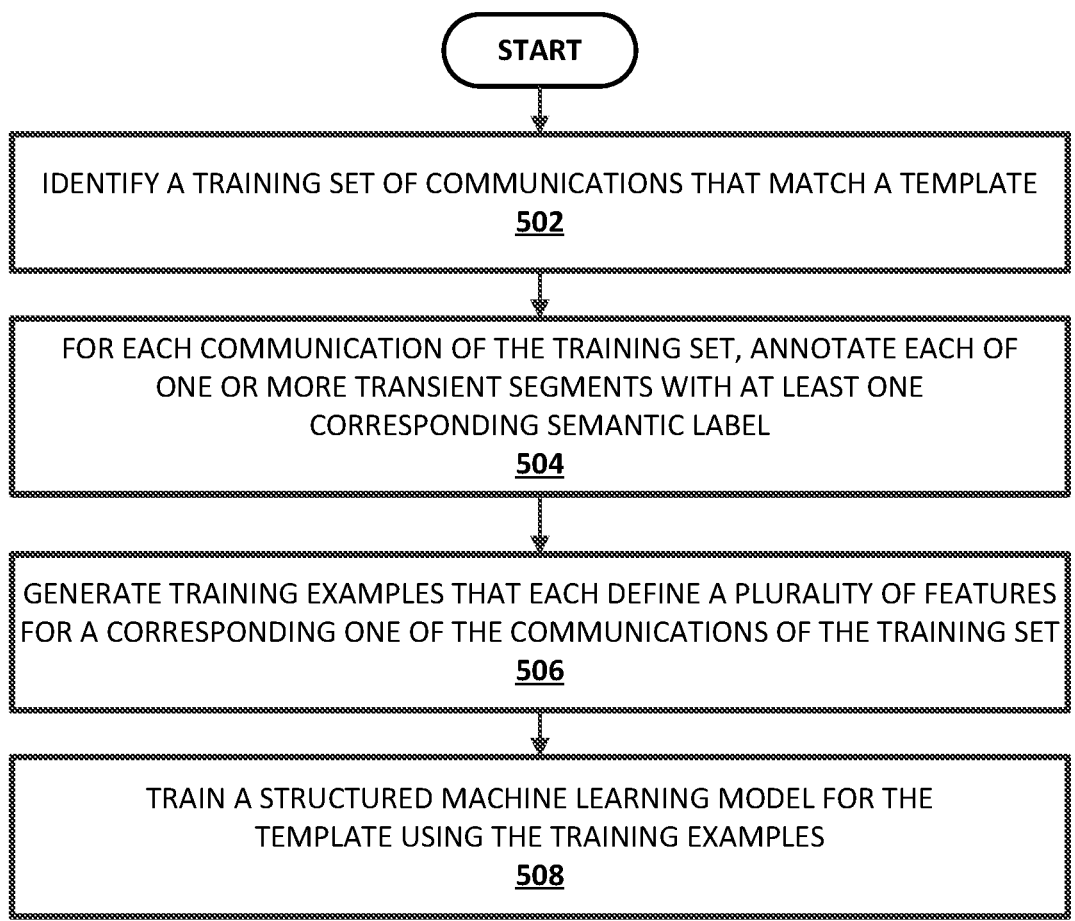
FIG. 5 depicts a flow chart illustrating an example method of training a structured machine learning model for a template.

Referring now to FIG. 5, an example method 500 of training a structured machine learning model for a template is described. For convenience, the operations of the flow chart are described with reference to a system that performs the operations. This system may include various components of various computer systems. Moreover, while operations of method 500 are shown in a particular order, this is not meant to be limiting. One or more operations may be reordered, omitted or added.

At block 502, the system identifies a training set of communications that match a template. For example, certain metadata (e.g., subject, sender) associated with communications of a cluster utilized to generate a template may be assigned to the template, and the one or more of the communications of the training set may be determined to match the template based on also having that metadata. Soft matching and/or exact matching may be utilized. As one example, an email may be determined to match a template based on it having a sender that matches the sender of other emails of a cluster utilized to generate the template. In some implementations, one or more of the communications of the training set may include those utilized to generate the template.

At block 504, for each communication of the training set, the system annotates each of one or more transient segments with at least one corresponding semantic label. For example, the system may annotate one or more transient segments of a communication based on output provided by a classifier in response to providing the classifier with one or more properties related to the transient segments. Also, for example, the system may annotate one or more transient segments of a communication based on them being defined in the template of block 502 as semantic labels for transient segments of all communications that conform to the template.

At block 506, the system generates training examples that each define a plurality of features for a corresponding one of the communications of the training set. Each of the training examples defines a plurality of features, at least some of which are based on a respective of the communications. Various features may be utilized, such as annotated semantic labels for one or more transient segments, a "fixed" label for one or more fixed segments, one or more terms of fixed segments, one or more terms of transient segments, locations (i.e., the order) of transient and/or fixed segments, etc.

At block 508, the system trains a structured machine learning model for the template using the training examples of block 506.

Figure 6:
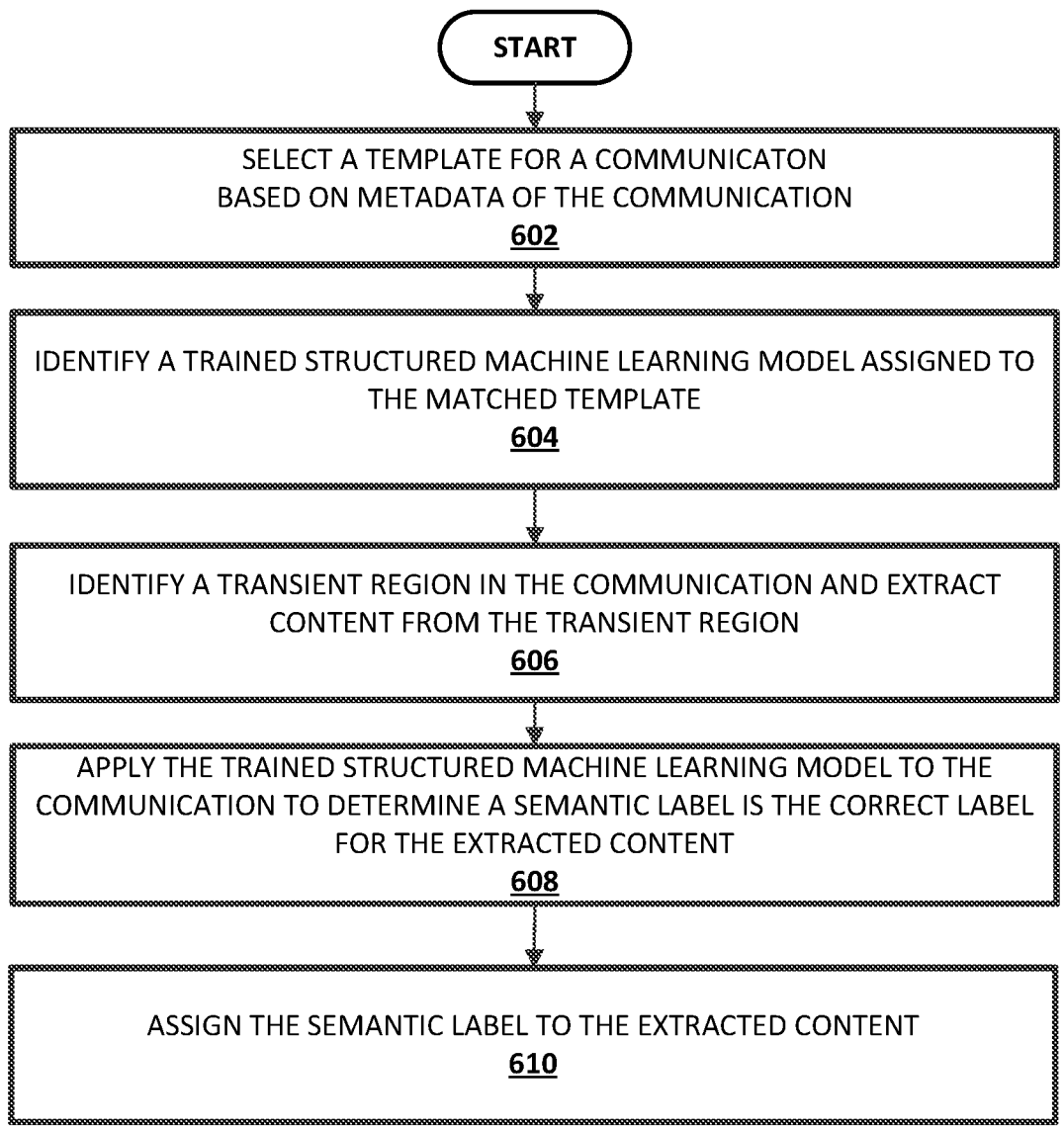
FIG. 6 depicts a flow chart illustrating an example method of extracting content from a transient segment of a communication and assigning a semantic label to the extracted content based on a trained structured machine learning model assigned to the template.

Referring now to FIG. 6, an example method 600 of extracting content from a transient segment of a communication and assigning a semantic label to the extracted content based on a trained structured machine learning model assigned to the template is described. For convenience, the operations of the flow chart are described with reference to a system that performs the operations. This system may include various components of various computer systems. Moreover, while operations of method 600 are shown in a particular order, this is not meant to be limiting. One or more operations may be reordered, omitted or added.

At block 602, the system selects a template for a communication based on metadata of the communication. For example, certain metadata (e.g., subject, sender) associated with communications of a cluster utilized to generate a template may be assigned to the template, and the communication may be determined to match the template based on also having that metadata. Soft matching and/or exact matching may be utilized. As one example, an email may be determined to match a template based on it having a sender that matches the sender of other emails of a cluster utilized to generate the template.

At block 604, the system identifies a trained structured machine learning model assigned to the matched template. For example, the trained structure machine learning model may be one generated for the template based on the method 500.

At block 606, the system identifies a transient region in the communication and extracts content from the transient region. In some implementations, the system may identify the transient region based on a location of the transient region defined in the template selected in block 602. In some implementations, the system may identify the transient region based on the trained structured machine learning model of block 604.

At block 608, the system applies the trained structured machine learning model to the communication to determine a semantic label is the correct label for the extracted content. For example, the system may apply the model to the transient region to determine a probability the semantic label is the correct semantic label for the transient region in view of parameters for the model and one or more properties of the communication. The system may determine the label is the correct label when the probability satisfies a threshold, such a fixed threshold and/or a threshold relative to one or more probabilities (if any) determined for other semantic labels by applying the model.

At block 610, the system assigns the semantic label to the extracted content. The system may provide the extracted content and the assigned semantic label for one or more purposes. For example, the system may provide, to a computing device of a recipient of the email (and independent of providing the email): the extracted content along with some kind of indication of the assigned semantic label. The indication may be, for example, text corresponding to the assigned semantic label and/or formatting applied to the extracted content, such as where (position) and/or how (e.g., font, size, color) the product is displayed. As one example, the extracted content may be provided to a personal assistant application of the computing device of the user and presented to the user via the personal assistant application. As another example, the extracted content maybe provided via a browser application, a calendar application, and/or other application.

Figure 7:
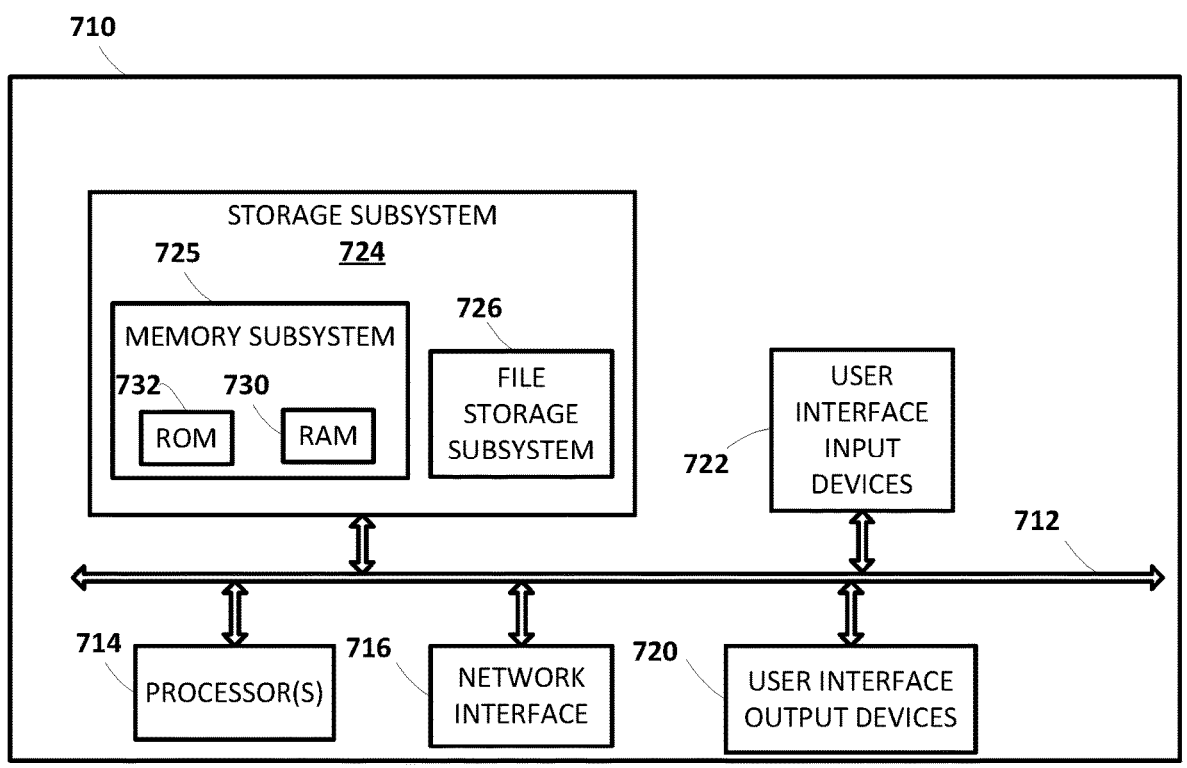
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, 500, and/or 600, and/or to implement one or more of cluster engine 124, path classifier engine 126, labeling engine 128, template generation engine 132, classifier 160, training engine 165, and/or data extraction engine 240.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    grouping a corpus of electronic communications into a plurality of clusters based on metadata associated with each communication;
    identifying, from communications of a particular cluster, a set of segments;
    classifying a plurality of the segments of the set of segments as transient segments, wherein classifying a given segment of the segments as a transient segment is based on determining variability of content of the given segment across the particular cluster satisfies one or more criteria, and wherein the classifying is performed without human access to content of the communications;
    classifying a plurality of the segments of the set of segments as fixed segments based on variability of content of the fixed segments across the particular cluster;
    generating a template for the cluster, the template defining an order of the transient segments, wherein the order of the transient segments is based on the particular cluster;
    for each communication of a training set of the communications of the particular cluster, annotating each of one or more of the transient segments with at least one corresponding semantic label, the annotating performed without human access to the content of the communications;
    generating training examples that each define a plurality of features for a corresponding one of the communications of the training set, the features including at least the annotated semantic labels for the transient segments and the order for the transient segments; and
    training a structured machine learning model for the template using the training examples, the trained structured machine learning model defining parameters for determining, for one or more of the transient segments, a corresponding probability that a given semantic label of the semantic labels is a correct label.

2. The computer-implemented method of claim 1, further comprising:
    identifying an additional communication as matching the template;
    selecting the trained structured machine learning model for the additional communication based on it being assigned to the template; and
    applying the assigned trained structured machine learning model to the additional communication to determine the probability that the given semantic label is a correct label for content of one of the transient segments in the additional communication.

3. The computer-implemented method of claim 1, wherein the semantic label annotated for at least one transient segment of the transient segments is the given semantic label and further comprising, for each of the communications of the training set:
    annotating the transient segment with a first probability that the given semantic label is correct for the transient segment for the communication, and
    annotating the transient segment with a second probability that the given semantic label is incorrect for the transient segment for the communication;
    wherein the features of the training examples further include weights for each of the training examples determined based on a corresponding one of the first and second probabilities.

4. The computer-implemented method of claim 3, wherein the trained structured machine learning model is a conditional random field machine learning model that is trained based on an expectation maximization algorithm.

5. The computer-implemented method of claim 1, further comprising:
    providing, as input to a classifier, one or more properties of content of the given transient segment in the communication; and
    receiving, as output from the classifier, a probability that the corresponding semantic label is correct for the given transient segment for the communication.

6. The computer-implemented method of claim 5, further comprising:
    annotating, for the communication, the given transient segment with the probability of the corresponding semantic label.

7. The computer-implemented method of claim 6, wherein the features for a training example for the communication include a weight of the training example that is determined based on the probability.

8. The computer-implemented method of claim 7, wherein the trained structured machine learning model is a conditional random field machine learning model.

9. The computer-implemented method of claim 5, further comprising:
    annotating the given transient segment with the corresponding semantic label for the communication only when the probability satisfies a threshold.

10. The computer-implemented method of claim 6, wherein annotating an additional transient segment of the transient segments with at least one corresponding semantic label for the communication of the training set comprises:
    determining the corresponding semantic label for the additional transient segment based on a regular expression or heuristics.

11. The computer-implemented method of claim 10, wherein the corresponding semantic label for the additional transient segment is indicative of price, order number, or tracking number.

12. The computer-implemented method of claim 11, wherein the corresponding semantic label for the given transient segment is indicative of a product name.

13. The computer-implemented method of claim 1, wherein the features of the training examples further include features of the fixed segments and an order of the fixed segments relative to one another and relative to the transient segments.

14. The computer-implemented method of claim 1, further comprising:
applying the trained structured machine learning model to determine a probability for a given semantic label for a given transient segment; and
assigning the given semantic label to the given transient segment in the template based on the probability satisfying a threshold.

15. A computer-implemented method, comprising:
grouping a corpus of electronic communications into a plurality of clusters based on metadata associated with each communication;
identifying, from communications of a particular cluster, a set of segments;
classifying a plurality of the segments of the set of segments as transient segments, wherein classifying a given segment of the segments as a transient segment is based on determining variability of content of the given segment across the particular cluster satisfies one or more criteria, and wherein the classifying is performed without human access to content of the communications;
generating a template for the cluster, the template defining an order of the transient segments, wherein the order of the transient segments is based on the particular cluster;
for each communication of a training set of the communications of the particular cluster:
annotating each of one or more of the transient segments with at least one corresponding semantic label, wherein the annotating is performed without human access to the content of the communications, and wherein the semantic label annotated for at least one transient segment of the transient segments is a given semantic label,
annotating the at least one transient segment with a first probability that the given semantic label is correct for the at least one transient segment for the communication, and
annotating the at least one transient segment with a second probability that the given semantic label is incorrect for the at least one transient segment for the communication;
generating training examples that each define a plurality of features for a corresponding one of the communications of the training set, the features including at least the annotated semantic labels for the transient segments, the order for the transient segments, and weights for each of the training examples determined based on a corresponding one of the first and second probabilities; and
training a structured machine learning model for the template using the training examples, the trained structured machine learning model defining parameters for determining, for one or more of the transient segments, a corresponding probability that the given semantic label of the semantic labels is a correct label.

16. A computer-implemented method, comprising:
grouping a corpus of electronic communications into a plurality of clusters based on metadata associated with each communication;
identifying, from communications of a particular cluster, a set of segments;
classifying a plurality of the segments of the set of segments as transient segments, wherein classifying a given segment of the segments as a transient segment is based on determining variability of content of the given segment across the particular cluster satisfies one or more criteria, wherein the classifying is performed without human access to content of the communications, and wherein the classifying comprises:
determining a count of occurrences of the given segment across the particular cluster,
determining the count of occurrences of the given segment across the particular cluster fails to satisfy a frequency threshold; and
determining, based on the count of occurrences of the given segment across the particular cluster failing to satisfy the frequency threshold, the variability of the content of the given segment across the particular cluster satisfies one or more of the criteria;
generating a template for the cluster, the template defining an order of the transient segments, wherein the order of the transient segments is based on the particular cluster;
for each communication of a training set of the communications of the particular cluster, annotating each of one or more of the transient segments with at least one corresponding semantic label, the annotating performed without human access to the content of the communications;
generating training examples that each define a plurality of features for a corresponding one of the communications of the training set, the features including at least the annotated semantic labels for the transient segments and the order for the transient segments; and
training a structured machine learning model for the template using the training examples, the trained structured machine learning model defining parameters for determining, for one or more of the transient segments, a corresponding probability that a given semantic label of the semantic labels is a correct label.

* * * * *